United States Patent
Barrell et al.

(10) Patent No.: US 10,877,844 B2
(45) Date of Patent: Dec. 29, 2020

(54) USING DELETABLE USER DATA STORAGE SPACE TO RECOVER FROM DRIVE ARRAY FAILURE

(71) Applicant: Seagate Technology LLC, Cupertino, CA (US)

(72) Inventors: Michael Barrell, Longmont, CO (US); Ian Davies, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 190 days.

(21) Appl. No.: 16/032,757

(22) Filed: Jul. 11, 2018

(65) Prior Publication Data

US 2020/0019464 A1   Jan. 16, 2020

(51) Int. Cl.
*G06F 11/00* (2006.01)
*G06F 11/10* (2006.01)

(52) U.S. Cl.
CPC ...... *G06F 11/1092* (2013.01); *G06F 11/1088* (2013.01)

(58) Field of Classification Search
CPC .............. G06F 11/1088; G06F 11/1092; G06F 13/1668; G06F 3/0614; G06F 3/0617; G06F 3/0619; G06F 3/0652
See application file for complete search history.

(56) References Cited

U.S. PATENT DOCUMENTS

| | | | |
|---|---|---|---|
| 7,039,827 B2 | 5/2006 | Meyer et al. | |
| 7,337,269 B2 * | 2/2008 | Umberger | G06F 3/0605 |
| | | | 711/112 |
| 7,484,038 B1 * | 1/2009 | Aiello | G06F 3/0613 |
| | | | 711/114 |
| 8,099,623 B1 * | 1/2012 | Li | G06F 11/1084 |
| | | | 714/6.22 |
| 8,601,311 B2 | 12/2013 | Horn | |
| 9,448,886 B2 * | 9/2016 | Shuster | G06F 3/0607 |
| 9,858,147 B2 * | 1/2018 | Minamiura | G06F 11/1088 |
| 2006/0143503 A1 * | 6/2006 | Shaik | G06F 3/061 |
| | | | 714/6.2 |
| 2010/0077252 A1 | 3/2010 | Siewert et al. | |
| 2010/0122115 A1 | 5/2010 | Olster | |
| 2015/0205668 A1 * | 7/2015 | Sundaram | G06F 3/0689 |
| | | | 714/6.24 |
| 2016/0019114 A1 * | 1/2016 | Han | G06F 11/1088 |
| | | | 714/764 |
| 2019/0391889 A1 * | 12/2019 | Luo | G06F 11/2094 |

* cited by examiner

*Primary Examiner* — Marc Duncan
(74) *Attorney, Agent, or Firm* — Mueting Raasch Group

(57) ABSTRACT

A plurality of stripe zones are mapped across drives in an array. A capacity of each of the stripe zones is smaller than or equal to an average size of the drives. A failed drive is determined in the array. A deletable stripe zone is selected that is being used for user data storage. The deletable stripe zone is taken offline and used to rebuild a subset of the plurality of the stripe zones affected by the failed drive.

20 Claims, 4 Drawing Sheets

|  | Less deletable | More deletable |
|---|---|---|
| 500 — Access patterns | High activity, recent activity | Low activity, no recent activity |
| 502 — Amount of stored data | Significant stored data | Little or no stored data |
| 504 — User data priority | High priority, critical data | Low priority, temporary data, redundant data |

USING DELETABLE USER DATA STORAGE SPACE TO RECOVER FROM DRIVE ARRAY FAILURE

SUMMARY

The present disclosure is directed to a drive array that uses user storage space to recover from partial or full drive failure of an array. In one embodiment, a plurality of stripe zones are mapped across drives in an array. A capacity of each of the stripe zones is smaller than or equal to an average size of the drives. A failed drive is identified in the array. A deletable stripe zone is selected that is being used for user data storage. The deletable stripe zone is taken offline. The deletable stripe zone is used to rebuild a subset of the plurality of stripe zones affected by the failed drive.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIGS. 2 and 3 are block diagrams showing recovery of a drive array in response to a failed disk according to example embodiments;

FIG. 4 is a block diagram showing recovery of a drive array in response to a failed disk according to another example embodiment;

DETAILED DESCRIPTION

The present disclosure generally relates to data storage server systems. Data storage systems generally use redundant array of independent disks (RAID) configuration that assembles multiple physical disks into one or more volumes. Various different RAID configurations are known that provide either increased performance (e.g., RAID level 0) or increased reliability (e.g., RAID levels 1, 5, 6, etc.). The multiple drives are presented as a logical volume that is treated by the host operating system as a single drive. For example, a RAID-1 setup presents two or more disks as a single disk, and the data is mirrored across all of the two or more disks such that in the event of the failure of one of the disks, the remaining one or more disks will have the previously stored data and continue to operate as a storage volume.

Figure 1:
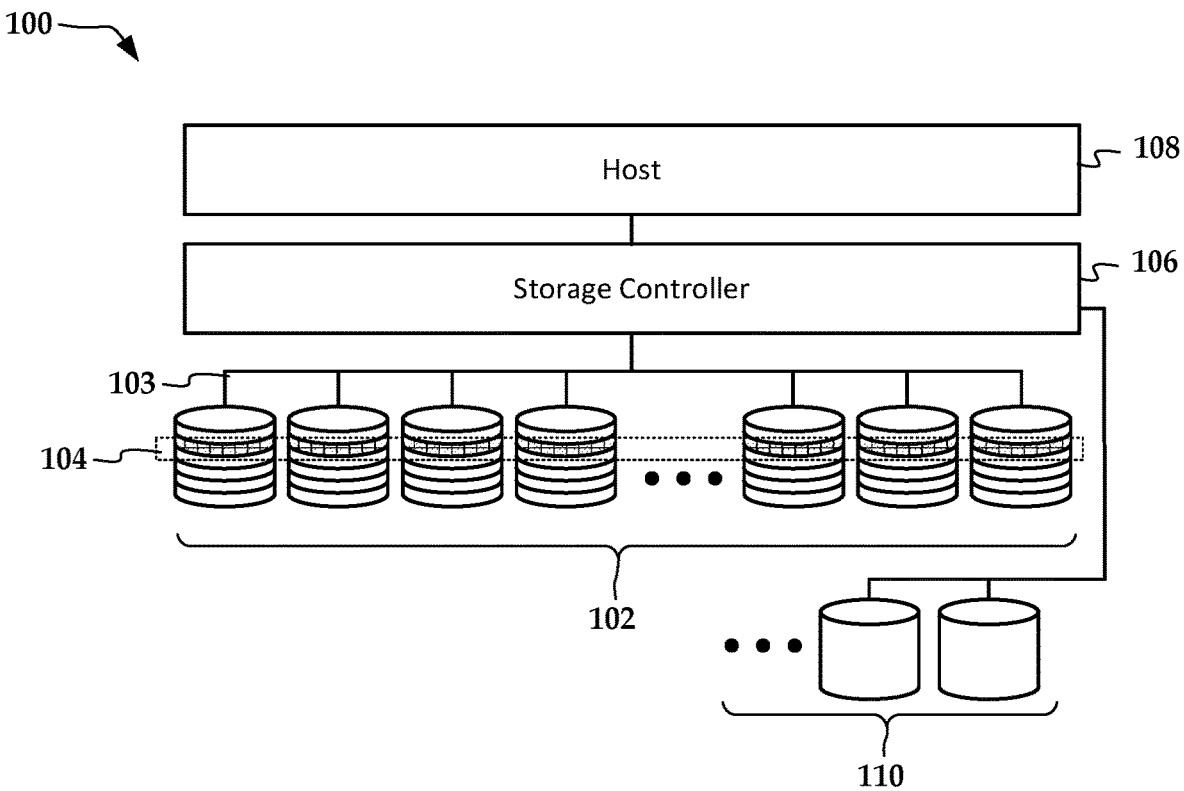
FIG. 1 is a block diagram of a system according to an example embodiment.

In the following embodiments, a storage server is described that uses a variant of a RAID controller. An example of such a storage system and apparatus 100 is shown in the block diagram of FIG. 1. The system/apparatus 100 includes a plurality of drives 102 that are mapped to multiple logical volumes, also referred to herein as logical unit numbers (LUNs). An example LUN 104 is shown spanning the drives 102. The shaded regions within the LUN 104 indicate disk regions, often referred to as "blocks" or "chunks" that store a portion of the data of the LUN 104. A storage controller 106 is coupled to the drives 102 via a bus 103 and manages, among other things, the definition of the LUNs, translation of read and write requests between the logical block addresses used by a host 108 and the addresses sectors of the disks 102 (which themselves are logical block addresses), calculation and verification of parity data, etc.

The storage controller 106 configures the LUNs as self-healing units, such that in the event of a partial or full drive failure, the controller 106 can perform the necessary repairs in the background without requiring input from the host 108. The operating system of the host 108 can treat each LUN as a standalone disk drive, simplifying the provisioning of the host operating system, e.g., use of standard drivers, not requiring the host to monitor LUN health, etc.

Note that the storage controller 106 may present the LUNs to multiple hosts, e.g., where the storage controller 106 includes a network interface and utilizes the appropriate network file access protocols. In other embodiments, a single host 108 may coupled to the storage controller 106 via a remote or local bus (e.g., SCSI, SATA, SAS, PCI-E, Fibre Channel) and present the LUNs to other hosts via a network file system protocol. In either event, there may be advantages in having the storage controller 108 manage self-healing aspects of the storage array.

One feature that assists in self-healing of the LUNs is the availability of spare storage capacity 110. The spare storage capacity 110 may include full disks (generally referred to as "hot spares") that are kept powered and coupled to the local drive bus such that the controller 106 can access the spare capacity 110 at any time. In other embodiments, some or all of the spare capacity 110 may be distributed among the active drives 102. This may involve identifying parts of the drives (e.g., partitions, chunks) that are not currently allocated to user storage as spare capacity that can be used to replace other equivalent parts (e.g., partitions, chunks) as they fail.

The amount spare capacity 110 may be defined by the end user when the system 100 is first configured. Generally, an increased amount of spare capacity 110 ensures long-term reliability, but at the expense of storage capacity that can be made available to the user. For example, a predetermined amount of spare capacity may be pre-defined to ensure specified total capacity is provided for five years. However, this number may be derived from a worst-case scenario, and as such may result in a significant amount of storage goes unused in some installations. As such, the end user may decide to provide a smaller amount of spare capacity 110 relative to the total number of operational drives 102. This can maximize storage capacity, although in increases risk of data loss. For example, when built-in spare capacity is exhausted, an additional failure of an operational drive may result in degraded performance and/or loss of access to LUNs that span the drive.

For example, if the LUNs are set up with one or more RAID-5 stripes, the LUN may still be operational if one drive (or portion of the drive, such as read/write head, used by the LUN) is lost and not replaced. However loss of another drive (or portion thereof) affecting the same LUN may result in loss of data. Thus the state of a RAID-5 with one failed block may be referred to as a critical mode. In another case, if the LUNs are set up with one or more RAID-6 stripes, then loss of one drive may result in a degraded operational mode, however the LUN can still tolerate loss of another drive. If another drive is lost, then the LUN would be in a critical mode. Depending on user requirements, a LUN entering degraded or critical modes may result on operations to the LUN being inhibited or halted. Because a single drive may be used a large number of LUNs, a loss of a drive in this way may affect all LUNs the same, resulting in a large-scale disruption.

In embodiments described herein, the storage controller 106 is configured to take storage space from one or more other LUNs and use the space occupied by those LUNs to compensate for a failed drive. This may involve taking a LUN completely off line or part of the LUN off line. In the either case, the changes to the LUN can be communicated to the host 108 via the protocol used to communicate with the host 108.

Figure 2:
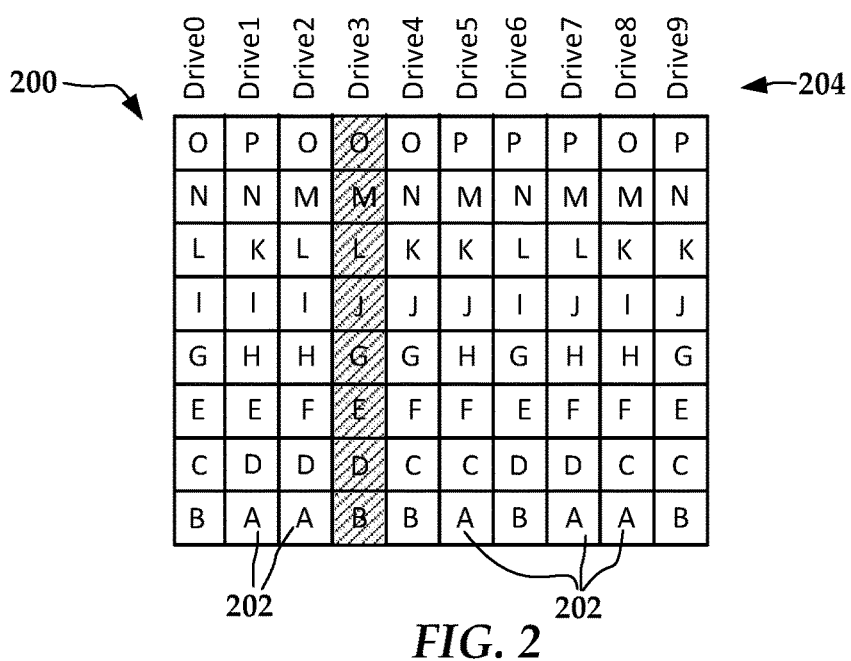
Figures 3, 4:
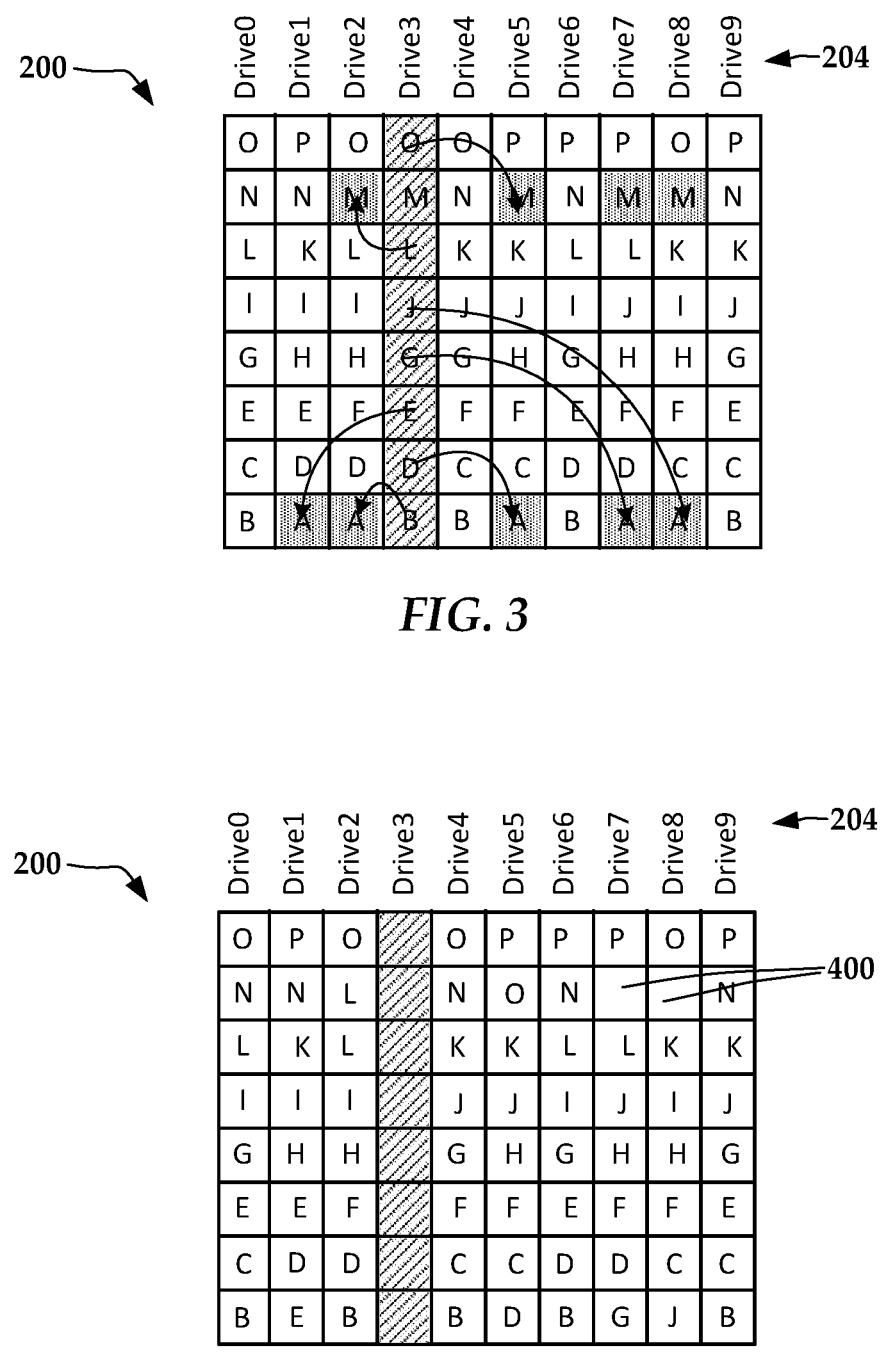

An example of drive array reconfiguration according to example embodiments is shown in FIGS. 2-4. As seen in FIG. 2, a plurality of drives 204 are configured into an array 200. This array 200 is simplified for ease of presentation, and implementations may include a much larger number of drives and elements than shown here. Each element of the array is a drive partition or other drive subunit that is used to form a stripe zone. The elements may also be referred to alternately herein as "subunits," "blocks" or "chunks." A stripe zone is a collection of the elements configured as a RAID stripe or other RAID-type collection. In FIG. 2, elements with the same letter are part of the same stripe zone. For example, elements 202 are all part of stripe zone "A." The stripe zone 202 may be configured as a RAID stripe that include both data and parity chunks. A capacity of the stripe zones may be smaller than or equal to an average size of the drives 200.

One or more stripe zones can be used to form a logical volume. For example, if each of the five blocks 200 was a 1 GB unit, and the stripe zones were configured as RAID-6, each stripe zone would have 3 GB available for user storage (2 GB being used for parity). So if the end user desired a 9-GB logical volume, three stripe zones would be assembled together into a single volume. For purposes of this example, there is assumed to be one stripe zone per logical volume, thus the terms may be used interchangeably in regards to this figure.

As indicated by the hatched blocks in FIG. 2, a drive (Drive3) in the array has failed, resulting in these blocks being unusable for reading or writing data. The logical volumes 202 may include redundancy features (e.g., one or more parity blocks) that allow recovering the data stored on the failed drive, but will need free space on which to reconstruct and store the data in order to resume normal operations. In this example, it may be assumed that no spare capacity was provisioned for the array 200 or that the spare capacity was provisioned but is now used up.

In FIG. 3, as indicated by the shaded blocks, two stripe zones (A and M) are taken offline and used to repair the failed drive. These stripe zones may be expendable for reasons known by the end user. For example, stripe zones A and M may include data that is recoverable elsewhere, such as being used as a local backup drive that is remotely mirrored. In yet another example, the stripe zones A and M may store data that can safely be discarded, such as temporarily cached data that is no longer needed. Or, the data in the stripe zones A and M may have lower priority than other stripe zones, and so the user is willing to allow this data to be lost in order to save the rest of the data in the array.

As indicated by the arrows in FIG. 3, the offline blocks of stripe zones A and M are reassigned to the others of the stripe zones to replace the failed blocks. Five blocks from stripe zone A are available, although only four blocks of stripe zone M are available because one block of stripe zone M is located on the failed drive. Generally, the reallocation shown in FIG. 3 sacrifices some data or capability provided by stripe zones A and M in order to keep stripe zones B-L and N-P in a desired working state. In FIG. 4, the array is shown with the mapping used after the reconfiguration shown in FIG. 3. Note that both stripe zones A and M are gone, blocks of the stripe zones being replaced by data from other stripe zones. Also note that blocks 400 are blank, as they were not needed to rebuild the failed disk. These blocks can be used by the system for spare capacity in the event of full or partial drive failures.

Note that FIGS. 2-4 show failure of an entire drive. In some cases, part of the drive may fail, such as one of a plurality of read/write heads that renders one disk surface of the drive unusable. The concepts shown in FIGS. 2-4 can be similarly applied, just requiring fewer volumes or stripe zones to be taken off line. Also, if the array is arranged such that all logical volumes include multiple stripe zones, then multiple stripe zones will be taken off line, even if not needed. For example, if a volume includes three stripe zones, each zone having ten blocks, then taking the volume offline to repair other volumes would involve taking 30 blocks offline. If, for example, only 20 blocks are needed to repair the failure, then the other 10 blocks would be converted to spare capacity.

In some embodiments, a logical volume may be selected to be taken offline based on an amount of spare capacity remaining after the repair. In the example above, a first volume with three stripe zones (30 blocks) may be user-defined as being usable for repair, as is a second volume with two stripe zones (20 blocks). If the indicated repair only requires 20 blocks, and the priorities of the first and second volume are otherwise equal, then the second volume may be selected if minimizing spare capacity is desired, as all 20 blocks can be used for repair without idling any blocks as spare capacity. In other embodiments, it may be desired to maximize the amount of spare capacity, in which case the first volume would be selected if all else was equal.

Figures 5, 6:
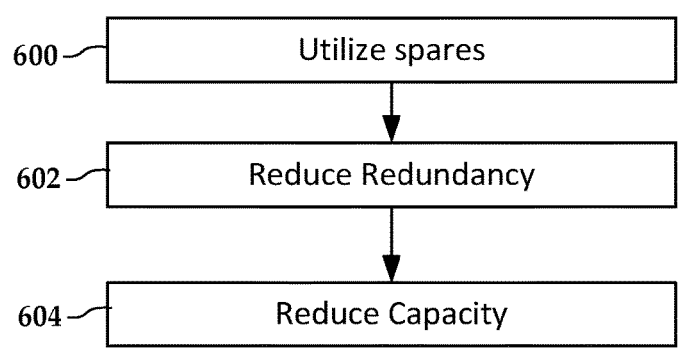
FIG. 5 is a table showing user-defined policies for logical volume recover according to example embodiments.
FIG. 6 is a diagram showing priorities for recovering additional storage space responsive to a drive failure according to an example embodiment.

In FIG. 5, a table indicates factors that may be considered in a policy for automatically (e.g., without user input after setting up the initial policy) determining which logical volumes to take offline according to an example embodiment. The amount of activity (e.g., number of read/write requests, amount of data read/written) and the recentness of activity may weight in for or against deleting and reusing stripe zones of a logical volume as indicated in row 500. As seen in row 502, amount of mapped data may also be a consideration, and user data priority shown in row 504 may also be a consideration. Note that any of the factors shown in FIG. 5 may be user-defined, and may include both defining which factors to consider as well as limits and other parameters that trigger the selection of a logical volume for reuse. By applying these policies automatically instead of waiting for user input, downtime of the failed parts of the array can be minimized.

Generally deletion and remapping a logical volume as described above would occur only when spare capacity is needed and isn't available. This can be the initial condition, or could occur later after other failures. In FIG. 6, a chart shows a hierarchy of how spare space can be obtained in the event of drive failure, from the first option 600 at the top to last option 604 at the bottom. Also note the intermediate option 602, which was described in U.S. patent application Ser. No. 16/016,012 filed on Jun. 22, 2018, which is incorporated herein by reference in its entirety. The ability to recover storage space in these ways can be set as a mode of operation the user enables or disables. A virtualized array could, instead of or in addition to deleting volume(s), make volumes more thin by reducing their physical backing capacity. Physical backing capacity represents the maximum currently usable capacity underlying the virtual storage. It can be added as needed or removed if not allocated. The physical backing capacity could be reduced by the number of stripe zones needed, returning this capacity as spare space.

Figure 7:
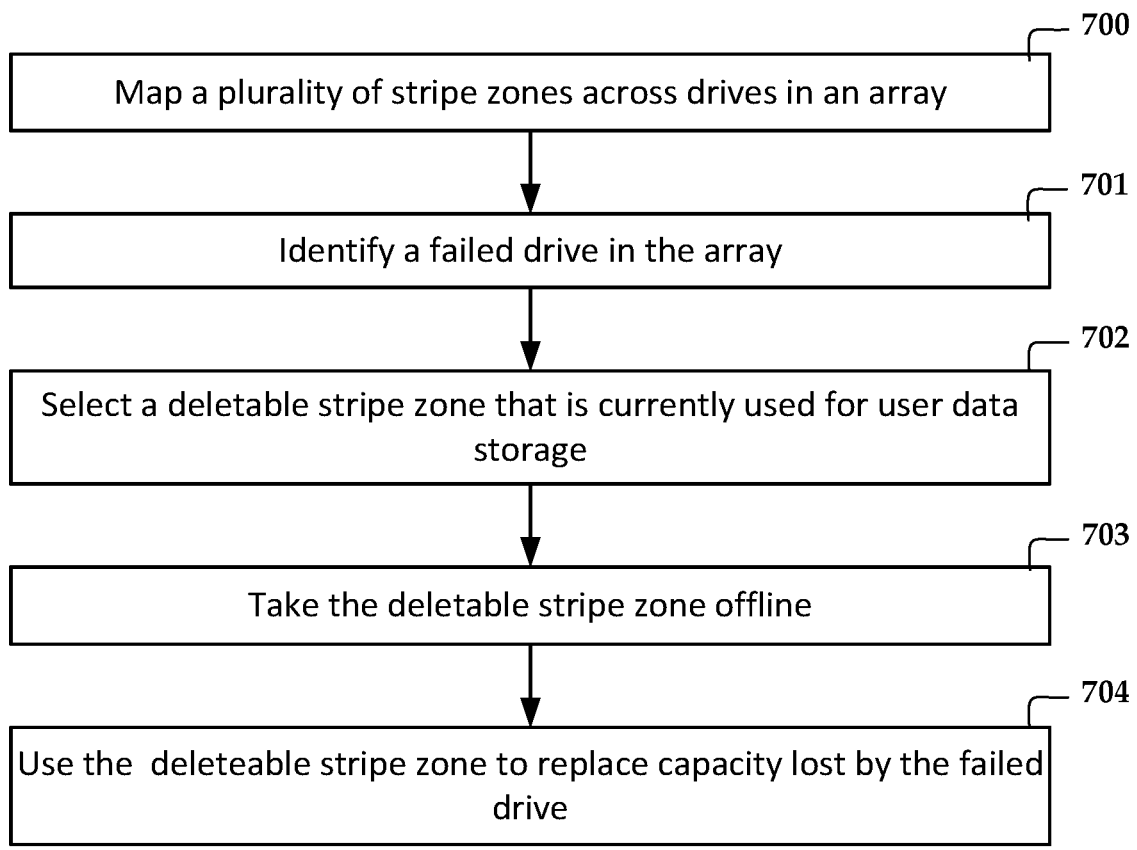
FIG. 7 is a flowchart of a method according to an example embodiment.

In FIG. 7, a flowchart shows a method according to an example embodiment. The method involves mapping 700 a plurality of stripe zones across drives in an array. A capacity of the logical volumes may be smaller than or equal to an average size of the drives. A failed drive in the array is identified 701, and a deletable stripe zone that is used for host storage is selected 702. The portion of the logical volumes offline is taken offline 703 in response. The drive may be fully or partially failed, and the portion of the logical volumes may include one or more full logical volumes or parts of one or more full logical volumes. The portion of the logical volumes is used 704 to rebuild the failed drive.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising
    mapping a plurality of stripe zones across drives in an array, wherein a capacity of each of the stripe zones is smaller than or equal to an average size of the drives, wherein the array is initially provisioned with no spare capacity or all spare capacity of the array has been used in response to previous failures in the array;
    identifying a failed drive in the array subsequent to there being no spare capacity in the array;
    selecting a deletable stripe zone that is being used for user data storage in response to identifying the failed drive;
    taking the deletable stripe zone offline; and
    using the deletable stripe zone to rebuild a subset of the plurality of stripe zones affected by the failed drive.

2. The method of claim 1, wherein the deletable stripe zone is part of a selected logical volume that includes two or more stripe zones, and wherein taking the deletable stripe zone offline comprises taking the two or more stripe zones offline.

3. The method of claim 2, wherein a portion of the capacity of the selected logical volume is not needed to rebuild the subset of the stripe zones affected by the failed drive, the method further comprising using the portion of the capacity of the selected logical volume as the spare capacity.

4. The method of claim 3, wherein the selected logical volume is selected to minimize the spare capacity.

5. The method of claim 1, wherein identifying the failed drive comprises determining that only part of the failed drive has failed.

6. The method of claim 1, further comprising utilizing a user-defined policy that is automatically used to select the deletable stripe zone in response to identifying the failed drive.

7. The method of claim 1, wherein the deletable stripe zone is selected based on a priority of user data stored on the deletable stripe zone.

8. The method of claim 1, wherein a portion of the capacity of the deletable stripe zone is not needed to rebuild the subset of the stripe zones affected by the failed drive, the method further comprising using the portion of the capacity as the spare capacity.

9. An apparatus, comprising:
    a bus operable to communicate with an array of drives, a plurality of stripe zones being mapped across the drives such that a capacity of each of the stripe zones is smaller than or equal to an average size of the drives, wherein the array is initially provisioned with no spare capacity or all spare capacity of the array has been used in response to previous failures in the array; and
    a controller coupled to the bus and operable to:
        identify a failed drive in the array subsequent to there being no spare capacity in the array;
        select a deletable stripe zone that is currently being used for user data storage in response to identifying the failed drive;
        take the deletable stripe zone offline; and
        use the deletable stripe zone to rebuild a subset of the plurality of stripe zones affected by the failed drive.

10. The apparatus of claim 9, wherein the deletable stripe zone is part of a selected logical volume that includes two or more stripe zones, and wherein taking the deletable stripe zone offline comprises taking the two or more stripe zones offline.

11. The apparatus of claim 10, wherein a portion of the capacity of the selected logical volume is not needed to rebuild the subset of the stripe zones affected by the failed drive, the controller further operable to use the portion of the capacity as the spare capacity.

12. The apparatus of claim 11, wherein the selected logical volume is selected to minimize the spare capacity.

13. The apparatus of claim 9, wherein identifying the failed drive comprises determining that only part of the failed drive has failed.

14. The apparatus of claim 9, wherein the controller is further operable to utilize a user-defined policy that is used to select the deletable stripe zone.

15. The apparatus of claim 9, wherein the deletable stripe zone is selected based on a priority of user data stored on the deletable stripe zone.

16. The apparatus of claim 9, wherein a portion of the capacity of the deletable stripe zone is not needed to rebuild the subset of the stripe zones affected by the failed drive, the controller further operable to use the portion of the capacity as the spare capacity.

17. A system, comprising:
    an array of drives, a plurality of stripe zones mapped across the array such that a capacity of the stripe zones is smaller than or equal to an average size of the drives, wherein the array is initially provisioned with no spare capacity or all spare capacity of the array has been used in response to previous failures in the array;

a storage controller coupled to the array and operable to:
  identify a failed drive in the array subsequent to there being no spare capacity in the array;
  in response to identifying the failed drive, select a deletable stripe zone that is being used for user data storage;
  take the deletable stripe zone offline; and
  use the deletable stripe zone to rebuild a subset of the plurality of the stripe zones affected by the failed drive.

18. The system of claim 17, wherein the deletable stripe zone is part of a selected logical volume that includes two or more stripe zones, and wherein taking the deletable stripe zone offline comprises taking the two or more stripe zones offline.

19. The system of claim 17, wherein the storage controller is further operable to automatically, in response to identifying the failed drive, utilize a user-defined policy that is used to select the deletable stripe zone based on a priority of user data stored on the deletable stripe zone.

20. The system of claim 17, wherein a portion of the capacity of the deletable stripe zone is not needed to rebuild the subset of the stripe zones affected by the failed drive, the storage controller further operable to use the portion of the capacity as the spare capacity.

* * * * *